US008619744B2

(12) United States Patent
Yoshida et al.

(10) Patent No.: US 8,619,744 B2
(45) Date of Patent: Dec. 31, 2013

(54) RECEPTION METHOD AND RECEIVER

(75) Inventors: Shousei Yoshida, Tokyo (JP); Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 435 days.

(21) Appl. No.: 12/445,886

(22) PCT Filed: Oct. 16, 2007

(86) PCT No.: PCT/JP2007/070137
§ 371 (c)(1),
(2), (4) Date: Apr. 16, 2009

(87) PCT Pub. No.: WO2008/047776
PCT Pub. Date: Apr. 24, 2008

(65) Prior Publication Data
US 2010/0208718 A1 Aug. 19, 2010

(30) Foreign Application Priority Data
Oct. 16, 2006 (JP) ................................ 2006-281362

(51) Int. Cl.
*H04J 1/00* (2006.01)
*H04B 7/00* (2006.01)
*H04B 1/10* (2006.01)
*H03D 1/04* (2006.01)

(52) U.S. Cl.
USPC ........... 370/343; 370/210; 370/344; 375/346; 375/349; 455/500

(58) Field of Classification Search
USPC ......... 370/203, 208, 210, 278, 281, 282, 286, 370/295, 302, 330, 343, 344; 375/150, 260, 375/267, 324, 326, 346, 347, 348, 349, 375/350; 455/113, 278.1, 17, 24, 61, 500, 455/501, 507, 326
See application file for complete search history.

(56) References Cited

U.S. PATENT DOCUMENTS 6,058,145 A 5/2000 Komaki et al.
6,381,263 B1 4/2002 Suzuki
(Continued)

FOREIGN PATENT DOCUMENTS

CN 1365586 8/2002
CN 1819575 8/2006
(Continued)

OTHER PUBLICATIONS

Search report PCT/JP2007/070137 Jan. 22, 2008.
(Continued)

*Primary Examiner* — Awet Haile
(74) *Attorney, Agent, or Firm* — Young & Thompson

(57) ABSTRACT

In a reception method and a receiver, a base station corrects a frequency offset contained in a reception signal from each user terminal and realizes excellent reception characteristics by using a simple receiver mechanism for performing frequency domain processing in a radio system using a frequency division multiplex (FDM) method. The base station includes: a DFT section that converts reception signals from a plurality of mobile stations communicating by radio communication using FDM all at once into the frequency domain; a demapping section that recognizes, from the frequency domain signals, user signals corresponding to respective mobile stations by using sub-carriers selected in association with respective mobile stations; a correction signal generation section generating a correction signal correcting a user signal frequency offset for each user signal; a frequency conversion section that corrects the frequency offset of the user signal by the correction signal; and a demodulation section that demodulates each of the corrected user signals.

14 Claims, 4 Drawing Sheets

(56) References Cited

U.S. PATENT DOCUMENTS

| | | | |
|---|---|---|---|
| 7,349,483 B2 | 3/2008 | Seki et al. | |
| 7,738,538 B1* | 6/2010 | Tung | 375/150 |
| 2002/0159414 A1 | 10/2002 | Kanemoto et al. | |
| 2004/0190657 A1 | 9/2004 | Seki et al. | |
| 2006/0002359 A1* | 1/2006 | Kim et al. | 370/343 |
| 2007/0004337 A1* | 1/2007 | Biswas et al. | 455/63.1 |
| 2007/0004465 A1* | 1/2007 | Papasakellariou et al. | 455/571 |
| 2007/0070879 A1 | 3/2007 | Yoshida et al. | |
| 2007/0140323 A1* | 6/2007 | Patel et al. | 375/149 |
| 2007/0206558 A1* | 9/2007 | Akita et al. | 370/344 |
| 2008/0019427 A1* | 1/2008 | Riddle et al. | 375/148 |

FOREIGN PATENT DOCUMENTS

| | | |
|---|---|---|
| JP | 10-070520 | 3/1998 |
| JP | 10-190609 | 7/1998 |
| JP | 11-346204 | 12/1999 |
| JP | 2001-308820 | 11/2001 |
| JP | 2003-152676 | 5/2003 |
| JP | 2003-516036 | 5/2003 |
| JP | 2004-272472 | 9/2004 |
| JP | 2004-274722 | 9/2004 |
| JP | 2004-531168 | 10/2004 |
| JP | 2005-253021 | 9/2005 |
| JP | 2006-094252 | 4/2006 |
| JP | 2007-096468 | 4/2007 |
| KR | 10-0498294 | 7/2005 |

OTHER PUBLICATIONS

Ryota Kimura, Ryuhei FuNADA, Hiroshi Harada, Shoji Shinoda, "Nobori Link DPC-OF/TDMA ni Okeru Timing Dokiho no Teian", IEICE Technical Report, vol. 104, No. 20, The Institute of Electronics, Information and Communication Engineers, Apr. 16, 2004, pp. 43 to 48, A New Timing Synchronization Method for Uplink DPC-OF/TDMA.

NTT DoCoMo, Fujitsu Mitsubishi Electric Corporation, NEC, Panasonic, SHARP, Toshiba Corporation, Orthogonal Pilot Channel in the Same Node B in Evolved UTRA Uplink, TSG-RAN WG1 #42bis, R1-051142, Oct. 14, 2005.

Frequency Domain Equalization for Single-Carrier Broadband Wireless Systems, D. Falconer, S.L. Ariyavisitakul, A. Benyamin-Seeyar, and B. Eidson, IEEE Communications Magazine, vol. 40, No. 4, Apr. 2002, pp. 58-66.

Korean Office Action issued Jan. 7, 2011 in corresponding Korean Application No. 10-2009-7009903 with English translation of the relevant parts of the Korean Office Action.

CN Office Action dated Oct. 9, 2012, with English translation; Application No. 200780038486.6.

* cited by examiner

RECEPTION METHOD AND RECEIVER

TECHNICAL FIELD

The present invention relates to a reception method and a receiver in a radio system to which a frequency-division multiplex method such as SC-FDMA (Single-Carrier Frequency Division Multiple Access) or OFDMA (Orthogonal Frequency Division Multiple Access) is applied and, more particularly, to demodulation processing of a reception signal.

BACKGROUND ART

In an uplink radio access system for next-generation mobile communication, importance is attached to a high transmission power efficiency of mobile stations in order to expand communication areas. For such a system, SC-FDMA having relatively low PAPR (Peak to Average Power Ratio) is believed to be advantageous. Realization of high-speed data transmission is highly required in next-generation mobile communication. However, in an environment where high-speed data transmission is performed using a single carrier (hereinafter, referred to merely as "SC"), there arises a problem of multipath interference, i.e., interference between symbols received by multipath occurs.

A linear equalizer is known as a means for suppressing the multipath interference. Non-Patent Document 1 to be described later has proposed a frequency domain equalizer that performs equalization processing as signal processing in a frequency domain so as to significantly reduce the amount of calculation. A conventional SC receiver performs equalization processing in a frequency domain like a technique disclosed in Non-Patent Document 1, while performs signal processing such as conversion of each user signal into a signal having a carrier center frequency, reception filtering, or channel estimation in a time domain.

On the other hand, an SC-FDMA receiver performs all demodulation processing including channel estimation as well as equalization processing in a frequency domain. Thus, the structure of a receiver can be simplified. Concerning an SC-FDMA receiver, Japan Patent Application No. 2005-280091 discloses a multi-user receiver that applies DFT (Discrete Fourier transform) to SC-FDMA signals all, at once for all users and performs reception filtering, channel estimation, or equalization, processing in a frequency domain.

Non-Patent Document 1: D. Falconer, S. L. Ariyavisitakul, A. Benyamin-Seeyar, and B. Eidson, "Frequency domain equalization for single-carrier broadband wireless access," IEEE Commun. Mag. vol. 40, no. 4, pp. 58-66, April 2002.

SUMMARY OF INVENTION

Technical Problem

In SC-FDMA, system frequency band is divided among a plurality of users. In this case, however, a frequency offset $\Delta f$) is caused on a per user basis due to frequency shift of the local oscillator or Doppler variation generated due to high-speed movement of a mobile object.

FIG. 2 shows a schematic example of the frequency offset on the SC-FDMA. With attention focused on a signal of user 2 of FIG. 2, it can be seen that a frequency offset $\Delta$ f2 where carrier center frequency fc is shifted from the center f0 of a reception filter has been generated. This offset $\Delta$ f2 causes distortion in the reception signal of user 2, resulting in signal power loss. Further, adjacent channel interference is caused due to frequency offsets $\Delta$ f1 and $\Delta$ f3 of users 1 and 3 and, thereby, signals of users 1 and 3 leak into the signal and filter range of user 2, thereby degrading reception characteristics of user 2.

From the point of view of reception quality, it is desirable to eliminate adverse effect produced by the frequency offset to a maximum extent. However, the technique disclosed in Japan Patent Application No. 2005-280091 does riot take the frequency offset into consideration, thus impeding improvement in reception quality.

The present invention has been made in view of the above problems, and an object thereof is to provide a reception method and a receiver in which a base station can correct a frequency offset contained in a reception signal from each mobile station and realize excellent reception characteristics by using a simple receiver mechanism for performing frequency domain processing in a radio system using a frequency division multiplex method.

Solution to Problem

According to an aspect of the present invention, there is provided a reception method of a base station communicating with a plurality of mobile stations by radio communication using a frequency division multiplex method, comprising: converting reception signals from the plurality of mobile stations all at once into signals of a frequency domain; recognizing, from the signals of a frequency domain, user signals corresponding to respective mobile stations by using sub-carriers selected in association with respective mobile stations; generating a correction signal for correcting a user signal frequency offset for each of the user signals; and correcting the frequency offset of the user signal by the correction signal and demodulating each of the corrected user signals.

According to a second aspect of the present invention, there is provided a receiver comprising: a DFT section that converts reception signals from a plurality of mobile stations communicating by radio communication using a frequency division multiplex method all at once into signals of a frequency domain; a demapping section that recognizes, from the signals of a frequency domain, user signals corresponding to respective mobile stations by using sub-carriers selected in association with respective mobile stations; a correction signal generation section that generates a correction signal for correcting a user signal frequency offset for each of the user signals; a frequency conversion section that corrects the frequency offset of the user signal by the correction signal; and a demodulation section that demodulates each of the corrected user signals.

Advantageous Effects of Invention

According to the present invention, it is possible to correct a frequency offset contained in a reception signal from each, of a plurality of mobile stations communicating using a frequency division multiplex method for each reception signal by using a simple receiver mechanism for performing frequency domain processing, thereby realizing excellent reception characteristics.

Reference Signs List

| | |
|---|---|
| 1: | CP removal section |
| 2, 7, 13, 21, 24: | DFT section |
| 3: | Demapping section |
| 4-1 to 4-K, 27-1 to 27-K: | Frequency conversion section |
| 5-1 to 5-K: | Demodulation section |
| 6: | Reception filter |
| 8, 25: | Transmission/reception filter |
| 9: | Reference signal generation section |
| 10: | Channel estimation section |
| 11, 16: | IDFT section |
| 12: | Noise path removal section |
| 14: | Weight calculation section |
| 15: | Equalization filter |
| 17-1 to 17-K: | Frequency offset correction signal generation section |
| 18: | Frequency error detection section |
| 19: | Averaging filter |
| 20: | Complex sine wave generation section |
| 22-1 to 22-K: | Interference replica generation section |
| 23: | Symbol replica generation section |
| 26: | Replica generation section |
| 28: | mapping section |
| 29: | Interference replica subtraction section |
| 30-1 to 30-K: | Adding section |

DESCRIPTION OF EMBODIMENTS

Figure 1:
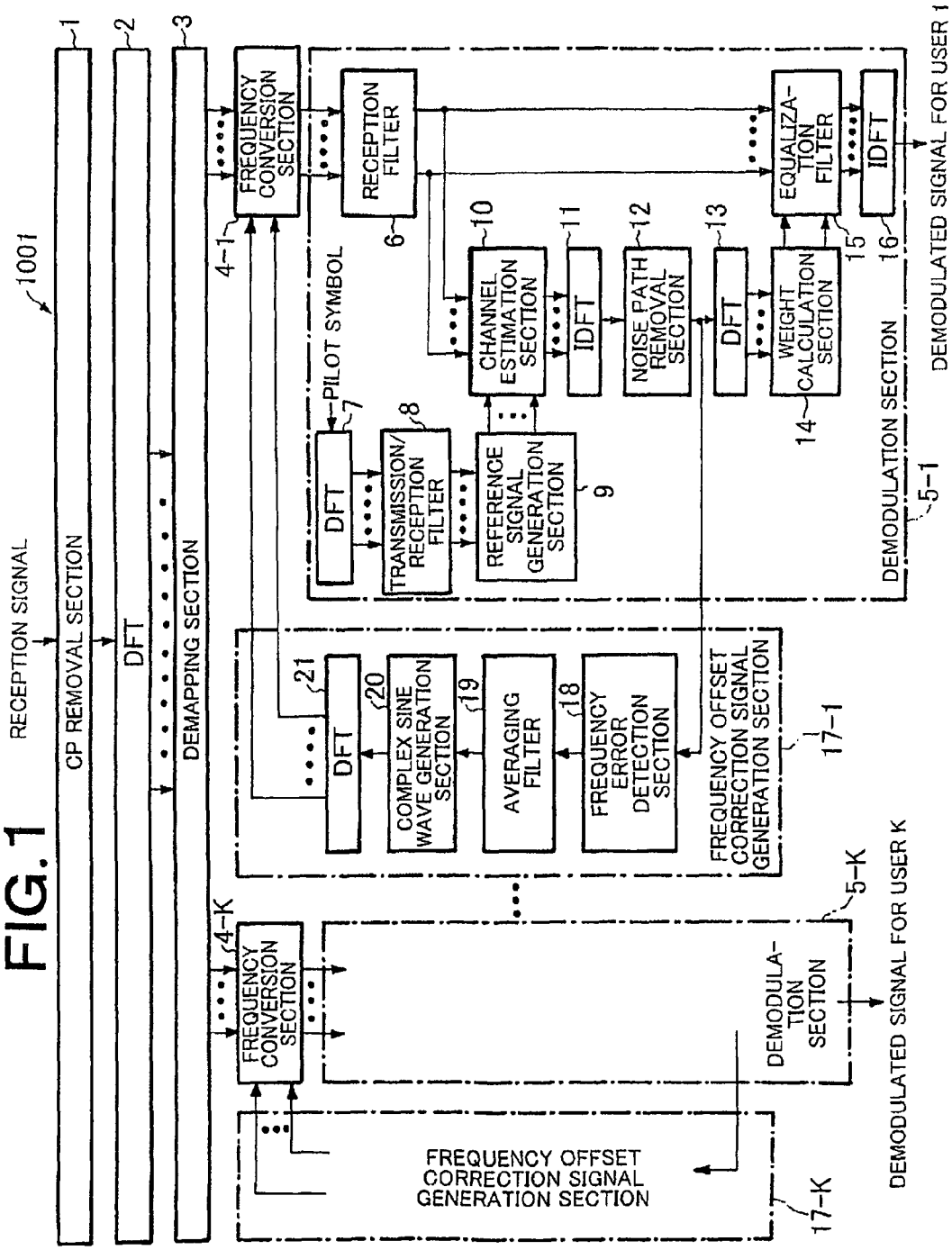
FIG. 1 is a configuration diagram showing a first exemplary embodiment of a receiver according to the present invention.
Figure 2:
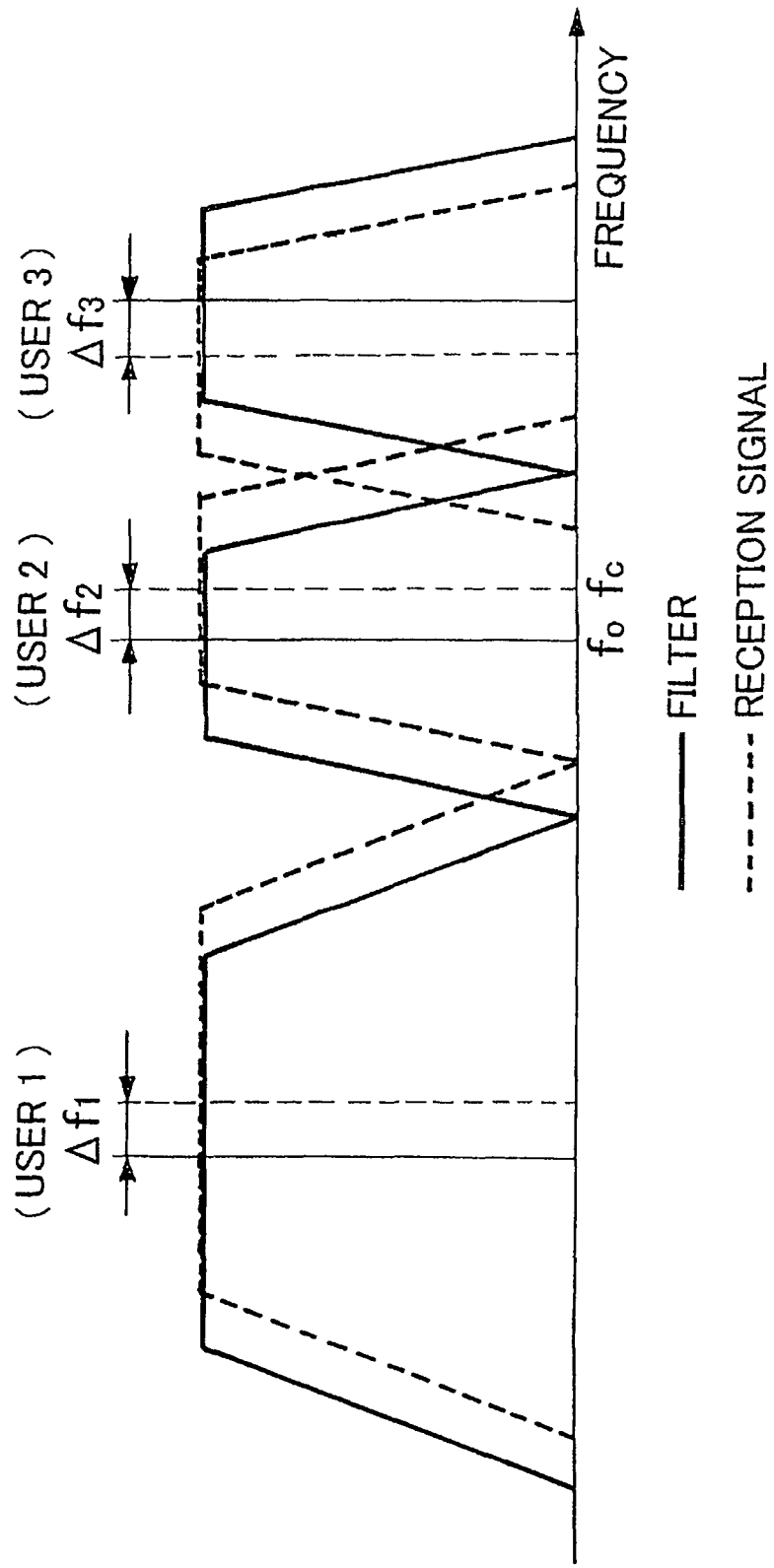
FIG. 2 is a view for explaining a frequency offset in SC-FDMA.

Exemplary embodiments of the present invention will be described below with reference to the accompanying drawings. FIG. 1 is a configuration diagram showing a first exemplary embodiment of a receiver according to the present invention. A receiver a radio base station connected to a plurality of user terminals (not shown) that communicate with one another by radio communication using SC-FDMA.

As shown in FIG. 1, the receiver 1001 includes a CP (Cyclic Prefix) removal section 1, a DFT section 2, a demapping section 3, frequency conversion sections 4-1 to 4-K (K is an integer corresponding to the number of users and is not less than 1) demodulation sections 5-1 to 5-K, and frequency offset correction signal generation sections 17-1 to 17-K.

Figure 3:
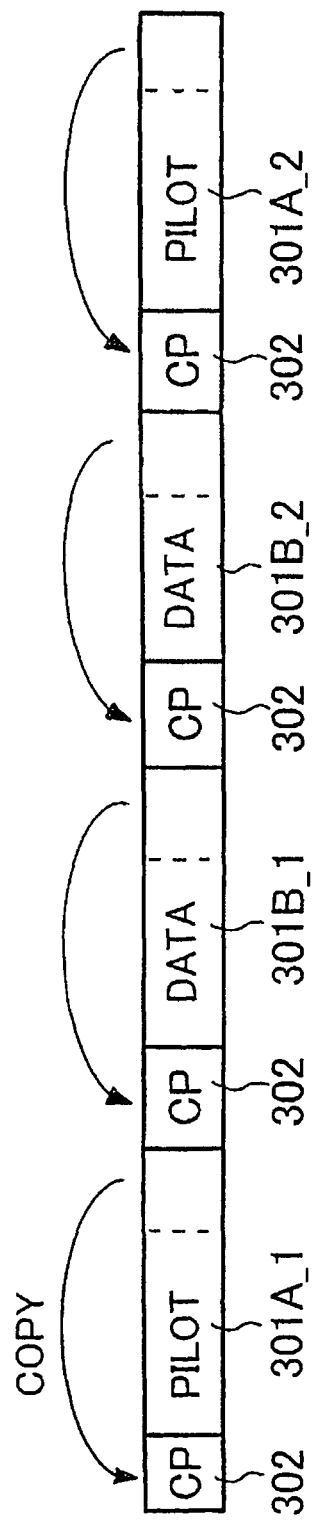
FIG. 3 is a view for explaining a radio frame format used in equalization processing in a frequency domain.

FIG. 3 shows an example of a radio frame format used in equalization processing in a frequency domain. A radio frame signal 300 includes a plurality of blocks of a pilot signal (301A) or data signal (301B) and CPs 302 added to the front of each block for avoiding multipath interference from the anterior block during Discrete Fourier Transform (DFT) processing. Each of the CPs 302 is generated by copying the last data of a corresponding block, to the front of the block. FIG. 3 shows a configuration in which pilot blocks 301A_1 and 301A_2 are positioned at the both ends of the radio frame signal 300 and two data blocks 301B_1 and 301B_2 are sequentially positioned between the pilot blocks 301A_1 and 301A_2.

The CP removal section 1 removes a part corresponding to the CP (302 of FIG. 3) from the frame of a reception signal.

The DFT section 2 applies NDFT-point (NDFT is an integer not less than 2) DFT to SC-FDMA signals received from user terminals all at once for all users to convert the SC-FDMA signals into signals of a frequency domain.

The demapping section 3 selects, for respective users, sub-carriers required for reception processing from all output sub-carriers obtained from the DFT section 2 to convert desired user signals into signals having a zero carrier frequency. That is, the demapping section 3 recognizes, using part of sub-carriers from the signals of a frequency domain obtained as a result of processing performed by the DFT section 2, signals of a frequency domain corresponding to reception signals from the respective user terminals.

Each of the frequency conversion sections 4-1 to 4-K corrects a frequency offset contained in a reception signal of each user. A signal after the frequency offset correction is represented by convolution between a reception signal that has been converted into a signal of a frequency domain and a frequency offset correction signal. Numerals 1, 2, and 3 show formulas of reception signal Xk of a frequency domain, frequency offset correction signal Fk, and signal X'k whose frequency offset has been corrected.

$$X_k = \sum_{n=0}^{N-1} x_n e^{-j2\pi nk/N} \quad \text{[Numeral 1]}$$

$$F_k = \sum_{n=0}^{N-1} f_n e^{-j2\pi nk/N} \quad \text{[Numeral 2]}$$

$$X'_k = \sum_{n=0}^{N-1} x_n f_n e^{-j2\pi nk/N} \quad \text{[Numeral 3]}$$

$$= \sum_{n=0}^{N-1} \left( \frac{1}{N} \sum_{m=0}^{N-1} X_m e^{j2\pi nm/N} \right) f_n e^{-j2\pi nk/N}$$

$$= \frac{1}{N} \sum_{m=0}^{N-1} X_m F_{k-m}$$

In the above formulas, Xn is a reception signal of a time domain, and in is a frequency offset correction signal (complex sine wave) of at time domain. X'k obtained by Numeral 3 is equivalent to a signal obtained by converting a reception signal that has been subjected to frequency offset correction in a time domain into a signal of a frequency domain.

Each of the demodulation sections 5-1 to 5-K includes a reception filter 6, a DFT section 7, a transmission/reception filter 8, a reference signal generation section 9, a channel estimation section 10, an IDFT (Inverse Discrete Fourier Transform) section 11, a noise path removal section 12, a DFT section 13, a weight calculation section 14, an equalization filer 15, and an IDFT section 16.

The reception filter 6 applies filtering to a reception signal obtained from the demapping section 3 to thereby suppress noise and separate signals of other users from the reception signal. As the reception filter 6, a raised-cosine roll-off filter (including roll-off rate=0) may be used.

The DFT section 7 applies DFT to a pilot symbol of a target user terminal to thereby convert the pilot symbol into a signal of a frequency domain.

The transmission/reception filter 8 applies filtering to the pilot symbol that has been converted into a signal of a frequency domain.

The reference signal generation section 9 uses an output of the transmission/reception filter 8 to calculate a pilot reference signal used in correlation processing with a pilot reception signal. A Zero-Forcing (ZE) that completely cancels a code characteristic of the pilot reception signal, Minimum Mean Square Error (MMSE) that suppresses noise enhancement in the correlation, processing, or clipping may be employed as the processing of the reference signal generation section 9.

It is only necessary to perform the above respective processing performed by the DFT section 7, transmission/reception filter 8, and reference signal generation section 9 once for each user. When the pilot reference signal is previously calculated and stored in a memory, the above respective processing may be omitted.

The channel estimation section 10 estimates a channel gain by performing correlation processing between the pilot reception signal of a frequency domain and pilot reference signal.

The IDFT section 11 once converts the estimated channel gain from a frequency domain to time domain channel response.

The noise path removal section 12 removes, from the channel response output from the IDFT section 11, a noise path, i.e., signals at points where there is only noise. A time window filter or noise threshold control may be employed as the processing of the noise path removal section 12. In the case of the time window filter, with the assumption that the channel response falls within the CP width, signals at points falling outside a zone corresponding to the CP width are substituted by 0 as the noise path. In the case of the noise threshold control, signals at points having a value not more than a predetermined noise threshold are substituted by 0 as the noise path.

The DFT section 13 converts the frequency domain channel response from which noise has been removed into a time domain signal.

The weight calculation section 14 uses the channel response obtained from the DFT section 13 to calculate an equalization weight in accordance with the abovementioned MMSE or ZF.

The equalization filter 15 multiplies data reception signal that has been subjected to the filtering by the reception filter 6 by the equalization weight calculated by the weight calculation section 14 to thereby equalize the reception signal in a frequency domain.

The IDFT section 16 applies NIDFT-point (NIDFT is an integer not less than 2) IDFT to the equalization signal of a frequency domain to convert the equalization signal of a frequency domain to signal of a time domain. The converted signal is output as a demodulated signal of the reception signal from a target user terminal.

Each of the frequency offset correction signal generation sections 17-1 to 17-K includes a frequency error detection section 18, an averaging filter 19, a complex sine wave generation section 20, and a DFT section 21.

The frequency error detection section 18 uses two successive time domain channel responses from which noise has been removed by the noise path removal section 12 to detect the frequency error of the reception signal. In the detection processing, the frequency error detection section 18 focuses attention on a pair of two paths having a larger level among a plurality of pairs of two paths obtained at the same timing between the two successive channel responses and detects the frequency error based on a phase variation between the pair of two paths. More specifically, in the frame configuration shown in FIG. 3, the frequency error detection section 18 detects paths where the levels of channel responses of the pilot blocks 301A_1 and 301A_2 positioned on both ends of the frame exceed a set value. Then, the frequency error detection section 18 obtains the complex conjugate of a complex channel gain of the detected first block (301A_1) and multiplies a complex channel gain of the second block (301A_2) to calculate a frequency error vector. Phase information represented by the calculated vector is supplied to the averaging filter 19 as a frequency error signal.

The average filter 19 averages the frequency error signal with a predetermined time constant to calculate a frequency offset.

The complex sine wave generation section 20 generates a complex sine wave corresponding to the block length of the reception signal based on the frequency offset. This complex sine wave is time domain information for correction of the frequency offset. Assuming that the frequency offset is $\Delta f$, complex sine wave fn is represented by the following Numeral 4.

$$f_n = e^{-j2\pi\Delta f n/N} \quad (0 \le \Delta f < 1) \qquad \text{[Numeral 4]}$$

where the maximum value of the frequency offset $\Delta f$ is set to a sub-carrier interval.

The PET section 21 applies PET to the complex sine wave to thereby convert the complex sine wave into a frequency offset correction signal of a frequency domain. The frequency offset correction signal which is a result of the calculation performed by the PET section 21 is supplied to a corresponding one of the frequency conversion sections (4-1 to 4-K).

The DFT result of a complex sine wave having a given frequency generated by the complex sine wave generation section 20 can be derived by analysis. Thus, the frequency offset correction signal may be generated by functional calculus using the frequency error signal or by table reference. This allows the frequency offset correction signal to be calculated directly from the frequency offset ($\Delta f$) which is an output of the averaging filter 19. Frequency offset correction signal Fk according to this method can be calculated using the following Numeral 5.

$$\begin{aligned}
F_k &= \sum_{n=0}^{N-1} f_n e^{-j2\pi n k/N} \qquad \text{[Numeral 5]} \\
&= \sum_{n=0}^{N-1} e^{-j2\pi\Delta f n/N} e^{-j2\pi n k/N} \\
&= \frac{\sin(\pi(k+\Delta f))}{\sin(\pi(k+\Delta f)/N)} e^{-j\pi(k+\Delta f)\left(\frac{N-1}{N}\right)} \\
&\approx sinc(\pi(k+\Delta f)) e^{-j\pi(k+\Delta f)} \text{ (for large } N)
\end{aligned}$$

As described above, the receiver 1001 according to the present exemplary embodiment converts the reception signals according to SC-FDMA from a plurality of users all at once into signals of a frequency domain, selects sub-carriers corresponding to respective user terminals from the signals of a frequency domain, and then performs demodulation processing after applying the frequency offset correction to the reception signals of respective users recognized using the selected sub-carriers. Thus, according to the present exemplary embodiment, it is possible to correct a frequency offset contained in a reception signal by using a simple receiver mechanism for performing frequency domain processing, thereby realizing excellent reception characteristics.

Figure 4:
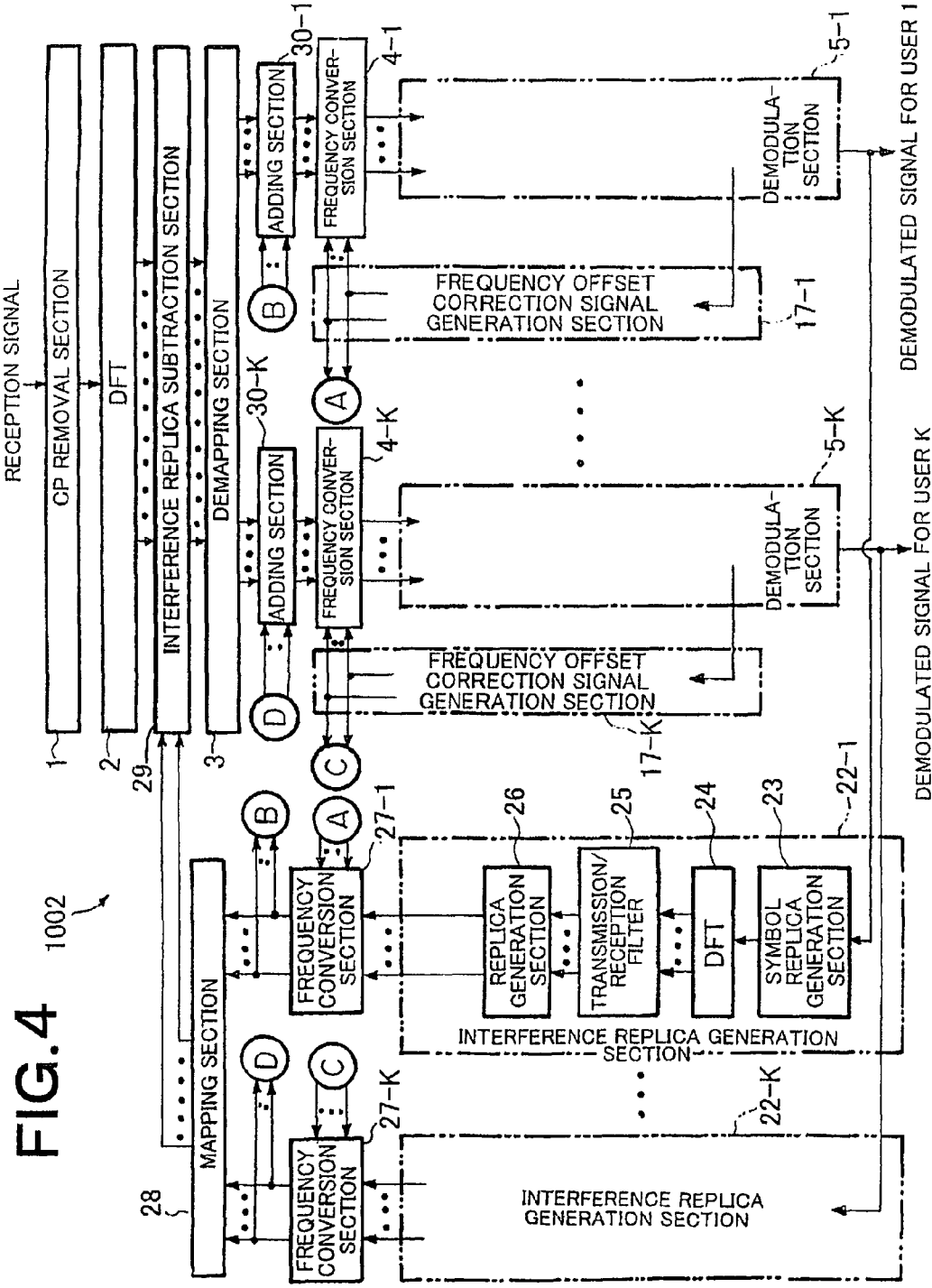
FIG. 4 is a configuration diagram showing a second exemplary embodiment of a receiver according to the present invention.

FIG. 4 shows a configuration of another exemplary embodiment. A receiver 1002 according to the present exemplary embodiment includes an interference replica subtraction section 29, adding sections 30-1 to 30-K (K corresponds to the number of users), interference replica generation sections 22-1 to 22-K, frequency conversion sections 27-1 to 27-K, and a mapping section 28, in addition to the components provided in the receiver 1001 of FIG. 1.

As shown in FIG. 4, each of the interference replica generation sections 22-1 to 22-K includes a symbol replica generation section 23, a DFT section 24, a transmission/reception filter 25, and a replica generation section 26.

The symbol replica generation section 23 performs bit decision on a demodulated signal and generates a symbol replica, i.e., a replica of the demodulated signal from the determination signal. A method of generating a hard decision symbol replica, a method that generates a hard decision symbol replica and multiplies the hard decision symbol replica by a predetermined replica weighting factor (constant number not more than 1), or a method of generating a soft decision symbol replica from a bit likelihood may be employed as the processing of the symbol replica generation section 23. Although a symbol replica is generated from a demodulated signal in the configuration shown in FIG. 4, the symbol replica, may be generated from a bit after error correction decoding in order to generate a higher accurate replica.

The DFT section 24 applies DFT to the symbol replica to thereby convert the symbol replica into a signal of a frequency domain.

The transmission/reception filter 25 applies filtering to the symbol replica of a frequency domain.

The replica generation section 26 multiplies the filtered symbol replica of a frequency domain by a channel gain to thereby generate an interference replica which is a replica of an interference signal.

Each of the frequency conversion sections 27-1 to 27-K gives a frequency offset of a corresponding user signal to the interference replica in order to associate the frequency offset of the user signal and frequency offset of the interference replica with each other. That is, each of the frequency conversion sections 27-1 to 27-K performs convolution between the interference replica and a frequency offset of a corresponding user so as to reflect the frequency offset in the interference replica.

The mapping section 28 synthesizes the interference replicas from the frequency conversion sections 27-1 to 27-K on a per sub-carrier basis to thereby map the synthesized interference replicas on the same DFT window as that for the reception signals.

The interference replica subtraction section 29 collectively subtracts the interference replicas of all users from reception signals of a frequency domain. Each of the adding sections 30-1 to 30-K adds the interference replica corresponding to each user signal received from the interference replica subtraction section 29 through the demapping section 3 and returns the resultant user signal.

Although adjacent channel interference between users is removed by the interference replica subtraction section 29 and adding sections 30-1 to 30-K in the configuration shown in FIG. 4, a configuration in which the adding sections 30-1 to 30-K have been omitted may be adopted for removing the adjacent channel interference between users. In this case, the mapping section 28 generates interference replicas for respective users, and the interference replica subtraction section 29 uses the generated interference replicas to remove the adjacent channel interference so as to allow desired user signals to remain.

As described above, the receiver 1002 generates, for respective users, the interference replicas from the demodulated signals of the respective users in addition to the operation of the abovementioned first exemplary embodiment. The receiver 1002 then subtracts the interference replicas of all users to which the frequency offset has been added from the reception signals to thereby remove the adjacent channel interference between user signals. Thus, according to the present exemplary embodiment, it is possible to realize excellent reception characteristics less subject to influence of the adjacent channel interference.

Although signal conversion between a time domain and frequency domain is performed using DFT and IDFT in the above exemplary embodiments, the signal conversion may be performed using Fast Fourier Transform (FFT), Inverse Fast Fourier Transform (IFFT), or any other signal conversion algorism.

Further, although SC-FDMA is used as a frequency division multiplex method in the above exemplary embodiments, the present invention is not limited thereto. For example, orthogonal frequency division multiple access (OFDMA) may be used as the frequency division multiplex method.

Hardware constituting each section in the receiver according to the above embodiments is not especially limited, but may be one of any type as long as it can realize its function. For example, a configuration in which each section constitutes a circuit or unit in an independent manner or a configuration in which all the sections are integrated in a single circuit or unit may be adopted. Further, at least a part of a function of each section may be realized by software processing of a processor (CPU: Central Processing Unit) provided in the receiver. In this case, a program used in the software processing of the processor and a recording medium (which may be implemented in the receiver or may be of a portable type) that stores the program are included in the category of the present invention.

Although the present invention has been described in detail with reference to the above exemplary embodiments, it should be understood that the present invention is not limited to the above exemplary embodiments. Various changes that those skilled in the art can understand can be made therein without departing from the sprit and scope of the invention.

This application is based upon and claims the benefit of priority from prior Japanese Patent Application No. 2006-281362 (filed Oct. 16, 2006), the entire contents of which are incorporated herein by reference.

INDUSTRIAL APPLICABILITY

As described above, the present invention may be applied to a reception method and a receiver in a radio system using a frequency division multiplex method such as SC-FDMA or OFDMA.

The invention claimed is:

1. A reception method of a base station communicating with a plurality of mobile stations by radio communication using a frequency division multiplex system, comprising the steps of:
  converting reception signals all at once into signals of a frequency domain, said reception signals being sent from the plurality of mobile stations;
  recognizing, from the signals of the frequency domain, user signals corresponding to respective mobile stations by using sub-carriers selected in association with the respective mobile stations, wherein each user signal recognized is separated from other user signals;
  generating respective correction signals for correcting respective frequency offsets of respective user signals,
  wherein the generating said respective correction signals comprises;
    detecting the respective frequency offsets of the respective user signals using time domain channel response;
    averaging the respective frequency offsets with a predetermined time constant;

calculating a complex sine wave based on the averaged respective frequency offsets; and generating said respective correction signals based on the complex sine wave;

correcting the respective frequency offsets of the respective user signals in the frequency domain by the respective correction signals and demodulating the respective corrected user signals;

wherein the generating said respective correction signals, the correction of the respective frequency offsets and the demodulation are executed for said each user signal from which the other user signals are already separated.

2. The reception method of the base station according to claim 1, wherein the base station detects the respective frequency offsets based on a phase variation between a pair of two paths having a larger level and exceeding a set value among a plurality of pairs of two paths obtained at the same timing between two successive time domain channel responses.

3. The reception method of the base station according to claim 1, wherein the frequency division multiplex system is SC-FDMA (Single-Carrier Frequency Division Multiple Access).

4. The reception method of the base station according to claim 1, wherein the frequency division multiplex system is OFDMA (orthogonal frequency division multiple access).

5. The reception method of the base station according to claim 1, the correcting the respective frequency offsets is made by convolution between the respective correction signals and the respective user signals.

6. The reception method of the base station according to claim 1, wherein the demodulating comprises: applying a filter to the corrected user signal;

estimating a channel gain of the filtered user signal using a channel estimation section;

converting the channel gain into the time domain channel response;

removing noise from the time domain channel response;

converting the channel response from which the noise has been removed into a frequency domain channel gain and calculating an equalization weight from the channel gain;

equalizing the filtered user signal using the equalization weight; and converting the equalized user signal into a user signal of a time domain and outputting the resultant user signal as a demodulated signal.

7. A receiver comprising:

a DFT (Discrete Fourier Transform) section that converts reception signals all at once into signals of a frequency domain, said reception signals being sent from a plurality of mobile stations communicating with the receiver by radio communication using a frequency division multiplex system;

a demapping section that recognizes, from the signals of the frequency domain, user signals corresponding to respective mobile stations by using sub-carriers selected in association with the respective mobile stations, wherein each user signal recognized is separated from other user signals;

a plurality of correction signal generation sections that generate respective correction signals for correcting respective frequency offsets of respective user signals;

wherein each of the plurality of correction signal generation sections comprises, section that detects the respective frequency offsets of the respective user signals using time domain channel response;

section that averages the respective frequency offsets with a predetermined time constant;

section that calculates a complex sine wave based on the averaged respective frequency offsets; and section that generate said respective correction signals based on the complex sine wave;

a plurality of first frequency conversion sections that correct the respective frequency offsets of the respective user signals in the frequency domain by the respective correction signals; and a plurality of demodulation sections that demodulate the respective corrected user signals;

wherein the generating said respective correction signals, the correction of the respective frequency offsets and the demodulation are executed for said each user signal from which the other user signals are already separated.

8. The receiver according to claim 7, wherein each of the plurality of correction signal generation sections detects the respective frequency offsets based on a phase variation between a pair of two paths having a larger level and exceeding a set value among a plurality of pairs of two paths obtained at the same timing between two successive time domain channel responses.

9. The receiver according to claim 7, wherein each of the plurality of frequency conversion sections corrects the respective frequency offsets by convolution between the respective correction signal and the respective user signals.

10. The receiver according to claim 7, wherein each of the plurality of demodulation sections comprises:

a reception filter for applying filtering to the user signal from the frequency conversion section;

a channel estimation section for estimating a channel gain of the filtered user signal;

a section that converts the channel gain into the time domain channel response;

a noise removal section that removes noise from the channel response;

a section that converts the channel response from which the noise has been removed into a frequency domain channel gain and calculating an equalization weight from the channel gain;

an equalization filter for equalizing the filtered user signal using the equalization weight; and a section that converts the equalized user signal into a user signal of a time domain and outputting the resultant user signal as a demodulated signal.

11. The receiver according to claim 7, wherein the frequency division multiplex system is SC-FDMA (Single-Carrier Frequency Division Multiple Access).

12. The receiver according to claim 7, wherein the frequency division multiplex system is OFDMA (orthogonal frequency division multiple access).

13. A base station comprising the receiver as claimed in claim 7.

14. A radio system comprising the base station as claimed in claim 13.

* * * * *

UNITED STATES PATENT AND TRADEMARK OFFICE
CERTIFICATE OF CORRECTION

PATENT NO.       : 8,619,744 B2
APPLICATION NO.  : 12/445886
DATED            : December 31, 2013
INVENTOR(S)      : Yoshida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this
Twenty-second Day of September, 2015

Michelle K. Lee
*Director of the United States Patent and Trademark Office*